United States Patent [19]
Hart et al.

[11] 3,940,106
[45] Feb. 24, 1976

[54] LATCHING VALVE FOR EXTENDIBLE WATERING SYSTEM FOR FOWLS

[75] Inventors: Harold W. Hart; Warren H. Hart, both of Glendale, Calif.

[73] Assignee: H. W. Hart Mfg. Co., Glendale, Calif.

[22] Filed: Jan. 28, 1974

[21] Appl. No.: 436,988

Related U.S. Application Data

[62] Division of Ser. No. 208,750, Dec. 16, 1971, Pat. No. 3,826,467, which is a division of Ser. No. 888,554, Dec. 29, 1969, Pat. No. 3,664,305.

[52] U.S. Cl. .............................................. 251/100
[51] Int. Cl.² ........................................ F16K 35/00
[58] Field of Search ............................. 251/95–100, 251/287, 297, 215

[56] References Cited
UNITED STATES PATENTS

| | | | |
|---|---|---|---|
| 2,690,895 | 10/1954 | Barcus | 251/297 |
| 2,723,829 | 11/1955 | Anderson | 251/100 |
| 2,763,459 | 9/1956 | Anderson | 251/100 X |
| 2,986,370 | 5/1961 | Girton | 251/100 |
| 3,098,636 | 7/1963 | Contella | 251/98 |
| 3,490,736 | 1/1970 | Synder | 251/215 |

*Primary Examiner*—Henry T. Klinksiek
*Attorney, Agent, or Firm*—Ellsworth R. Roston

[57] ABSTRACT

A pipeline comprises plastic pipe lengths interconnected by plastic couplings with telescoped joints and with plastic valves in each coupling. The pipeline is enclosed and supported by an adjustably suspended sheet metal housing assembly with a charged wire thereon to keep off fowls.

17 Claims, 8 Drawing Figures

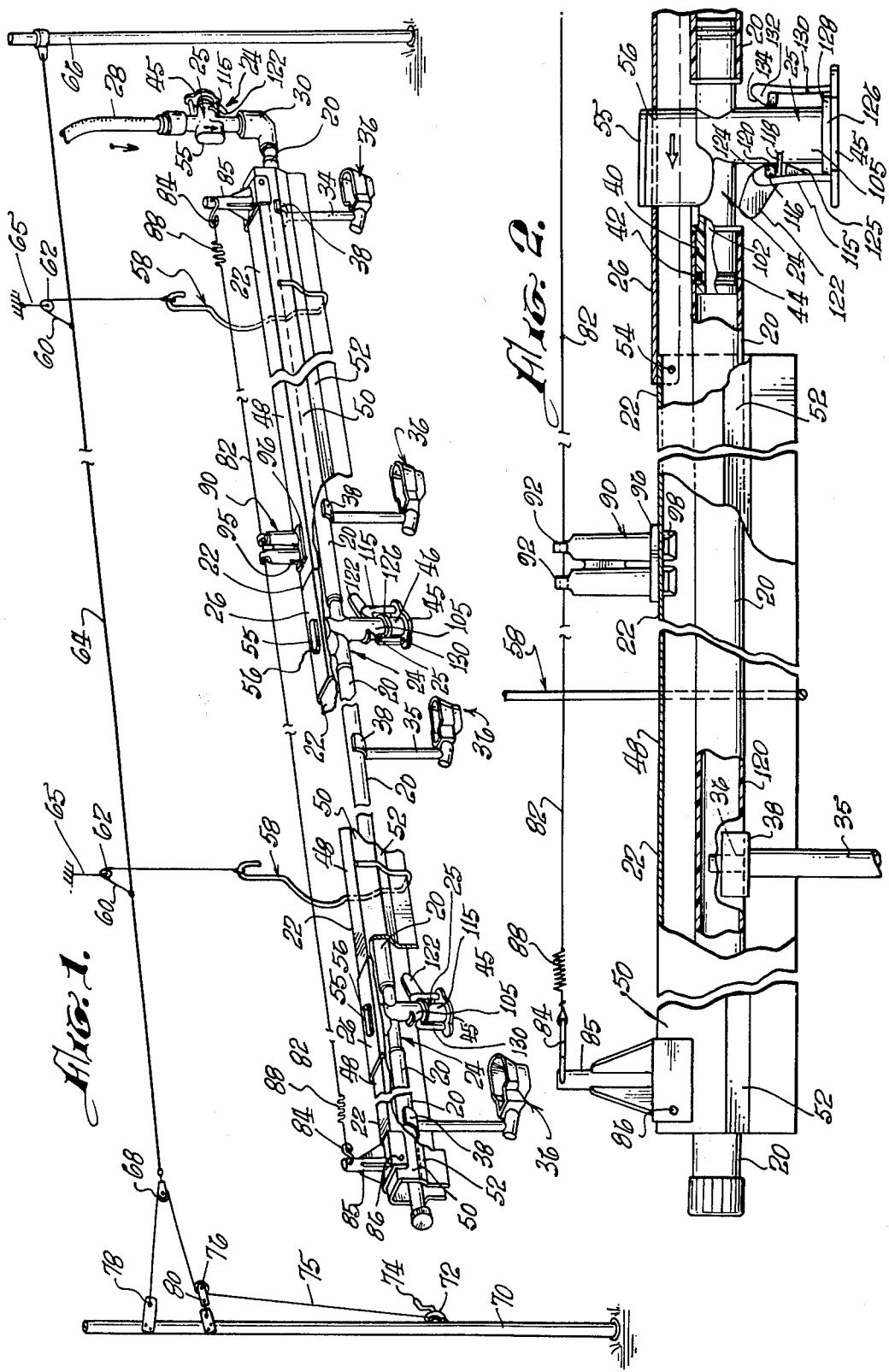

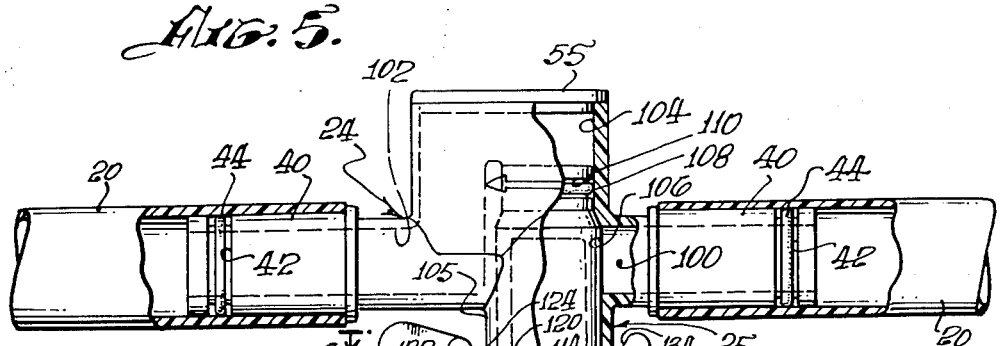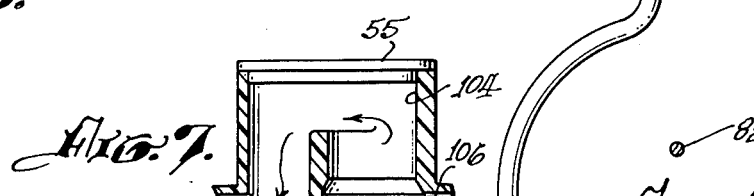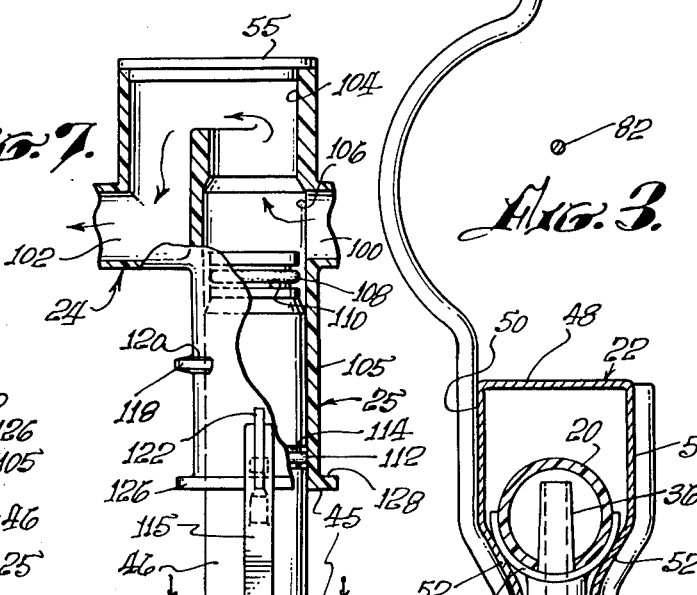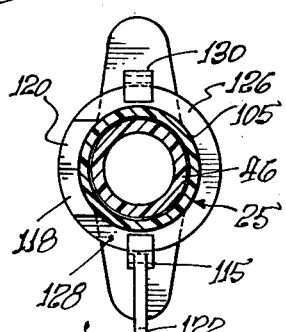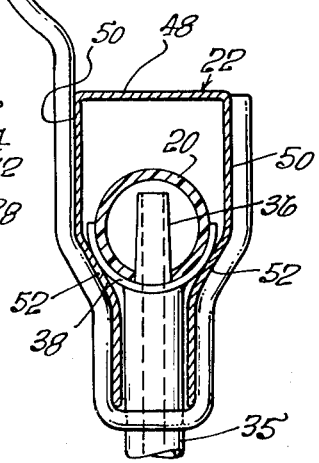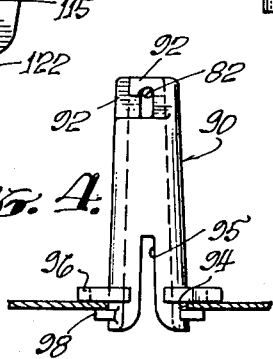

LATCHING VALVE FOR EXTENDIBLE WATERING SYSTEM FOR FOWLS

CROSS-REFERENCES TO RELATED APPLICATIONS

This is a divisional application of application Ser. No. 208,750, filed on Dec. 16, 1971, now U.S. Pat. No. 3,826,467, which in turn was a divisional application of application Ser. No. 888,594, filed Dec. 29, 1969, now U.S. Pat. No. 3,664,305, for Extendible Watering System for Fowls.

BACKGROUND OF THE INVENTION

Raising fowls profitably on a commercial scale involves the use of plastic pipelines, usually hundreds of feet long, equipped with numerous spaced drinking cups that dispense water in response to pecks by the fowls. Bearing in mind that low profit margins make it mandatory to minimize labor costs, such a water system should be capable of being easily and quickly installed and just as easily serviced and repaired when necessary. The watering cups must be capable of being periodically elevated in a time-saving manner as the birds mature. Above all, sanitary conditions must prevail at low maintenance cost, it being essential to keep the watering cups clean and to keep the fowls from perching on the pipeline. In addition, all exposed surfaces should be smooth and easily cleaned.

With further reference to sanitation, it is highly undesirable to lay the pipeline on the floor because it becomes an obstacle to freedom of movement on the part of the birds and, more important, because the underside of the pipeline forms crevices to trap food and foreign materials. It is further important that the drinking cups be sufficiently elevated to keep them from being fouled by the birds.

SUMMARY OF THE INVENTION

Water at a relatively low head is supplied to a pipeline that is made up of 10 foot sections of PVC pipe interconnected by plastic couplings, the opposite ends of the couplings simply telescoping into the pipe ends. The couplings carry O-rings to seal the joints effectively and with the aid of suitable lubricant the couplings may be quickly and easily installed.

The pipeline is both supported and enclosed by a corresponding housing assembly made up of ten foot sections of sheet metal of the cross-sectional configuration of inverted channels and the housing sections are interconnected by inverted sheet metal channel members that correspond to the plastic pipe couplings. Thus both the pipeline and its protective housing may be extended indefinitely by 10 foot increments.

The downwardly extending side webs of the housing sections converge for supporting engagement with the underside of the plastic pipe and form a narrowed longitudinal slot, the slot clearing downwardly extending branches of the plastic pipe that carry the individual drinking cups. Thus a section of the pipe with its pendent watering cups may be easily slid lengthwise into a corresponding housing section.

The housing sections are supported by hangers which, in turn, are supported from above by cables and in the preferred practice of the invention, a winch and cable system makes it possible to raise and lower a long run of the watering system as a single unit. Thus minimum time and effort are required for periodic changes in the elevation of the water cups as the birds mature. Each hanger serves a dual purpose in that it not only hooks under a housing section to support the housing section but also confines the two side webs of the housing section to keep them from spreading apart and thus releasing the plastic pipe.

With reference to sanitation, one feature of the invention is that the watering cups are directly below the sheet metal housing to be protected from above by the housing. In addition, the pipe itself is enclosed by the housing. As for the housing itself, it has a smooth corrosion-resistant surface that may be readily cleaned or dusted whenever desired.

Another feature is the concept of providing a "hot" line or electrically charged conductor just above the housing to keep the birds from perching on the housing. Suitable snap-on insulators are quickly attachable to the housing sections to hold the charged conductor in correct position and are designed for quick engagement with the cable.

With the drinking cups mounted on downwardly extending branches of the pipeline, the pipeline itself is elevated well above the heads of the birds. Consequently floor area is free from any crevices created by the pipeline that would tend to trap food or foreign particles and with the pipeline up out of the way and with the water cups elevated, the floor area is unencumbered for maximum freedom of movement by the birds.

The preferred practice of the invention is further characterized by the concept of incorporating into each coupling a suitable plastic valve that not only is reliable and easy to operate but also provides convenient visual indication of whether the valve is open or closed. With the plastic valves spaced ten feet apart, it is a simple matter to isolate any 10 foot pipe section for repair and replacement of drinking cups. With all of the valves closed, the valves may be opened in sequence along the length of the pipeline to supply water to the pipeline section by section for a quick check on the working condition of all of the drinking cups.

The features and advantages of the invention may be understoood from the following detailed description together with the accompanying drawings.

BRIEF DESCRIPTION OF THE DRAWINGS

In the drawings, which are to be regarded as merely illustrative:

FIG. 1 is a fragmentary perspective view, partly broken away, showing a pipeline embodying a preferred practice of the invention;

FIG. 2 is a fragmentary side elevation of a portion of the pipeline on a larger scale with parts broken away;

FIG. 3 is a sectional view showing how a hanger engages the pipeline housing;

FIG. 4 is an elevational view showing how an insulator is mounted in an aperture in the top housing wall;

FIG. 5 is an elevational view partly broken away showing a plastic coupling in the pipeline with a valve incorporated in the coupling, the valve being in closed position;

FIG. 6 is a transverse section along the angular line 6—6 of FIG. 5;

FIG. 7 is a fragmentary view similar to FIG. 6 showing the valve in open position; and FIG. 8 is a view similar to FIG. 6 showing the valve rotated 90° for release from a latch shoulder.

DESCRIPTION OF THE PREFERRED EMBODIMENT OF THE INVENTION

FIGS. 1 and 2 show a watering system comprising a pipeline made up of 10 foot sections 20 of PVC tubing protected by a housing assembly made up of ten foot housing sections 22. The pipe sections 20 are interconnected by couplings, generally designated 24, each of which incorporates a valve 25 and the housing sections 22 are interconnected by connecting members 26 which correspond to the pipe couplings.

The pipeline may be several hundred feet long and may be connected at either one end or at an intermediate point to an elevated water tank (not shown) by means of a flexible hose 28 which permits the pipe line to be adjusted in elevation relative to the floor and also permits the tank to be changed in elevation relative to the pipeline to vary the pressure in the pipeline. In the construction shown, one end of the pipeline is provided with an elbow 30 which is connected to a valve 24, the valve in turn being connected to the flexible hose.

Each pipe section 20 has a series of downwardly extending branches 34 which carry at their lower ends corresponding drinking cups 35 of a well known construction which supply water in response to pecks by the fowls. The branches 34 may also be made of PVC plastic and, in a well known manner, each branch 34 has a reduced upper end 36 (FIG. 3) which extends into the interior of the pipe section and each of the branches also has an integral cradle portion 38 (FIGS. 2 and 3) which fits against the under surface of the pipe and is suitably bonded to the pipe, for example by sonic welding.

As best shown in FIG. 5, each of the couplings 24 has two opposite nipple portions 40 which telescope into the ends of the corresponding pipe sections 20 and each of the nipple portions is formed with a circumferential groove 42 which seats a suitable O-ring 44 for sealing the joint. The valve 25 in each coupling is operated by a push-pull handle 45 which is the outer end of a valve member 46 and which is pushed in as shown in FIG. 5 to close the valve and is pulled out as shown in FIG. 7 to open the valve. The valve member 46 and its handle 45 are preferably of a different color from the coupling to make the parts distinctive so that a mere glance is all that is needed to ascertain whether the valve is open or closed.

Each housing section 22 is a galvanized sheet metal member of the cross-sectional configuration of an inverted channel, each housing section having a top wall 48 (FIG. 3) and two downwardly extending side webs 50 which are offset inwardly towards each other as indicated at 52. The confronting offset portions 52 form a seat for the cradle portions 38 of the pipe sections 20 and the lower edges of the two side webs form a longitudinal slot 52 through which the pipe branches 34 extend, the slot being substantially narrower than the pipe 20. The previously mentioned housing connecting members 26 are also inverted channel members made of galvanized sheet metal, each connecting member overlapping the ends of the two corresponding housing sections 22 and being suitably connected thereto. In the construction shown, each end of each connecting member 26 is connected to the corresponding housing section 22 by a transverse cotter pin 54 which extends through aligned apertures of the connecting member and the housing section respectively.

The body of each of the previously mentioned valves 25 has an upwardly extending enlargement 55 and each of the housing connector members 26 has an opening 56 (FIG. 2) in its top wall that receives the valve enlargement and thus prevents rotation of the valve out of its normal downwardly extending position.

Each of the housing sections 22 is supported by a heavy wire hanger 58 which, in turn, is supported from above by a cable 60 which may be adjusted to raise and lower the pipeline assembly as a unit. For this purpose, each of the upwardly extending cables 60 passes over an overhead pulley 62 and is connected to a main cable 64 that extends along the length of the whole pipeline assembly. Each of the pulleys 62 is supported from above by a short cable 65. One end of the main cable 64 is connected to fixed structure, for example a post 66, at one end of the pipeline assembly and the other end of the main cable is connected to a pulley 68.

A post 70 or similar fixed structure near the second end of the pipeline carries a winch 72 that is operable by a crank 74. A control cable 75 is wound on the winch and extends upwardly therefrom to pass around a pulley 76 and around the previously mentioned pulley 68, the upper end of the control cable being anchored to the post 70 by a bracket 78. The fixed pulley 76 is connected to the post by a similar bracket 80. It is apparent that the control cable 75 may be manipulated by the winch 72 to raise and lower all of the hangers 58 simultaneously. A suitable pawl-and-ratchet mechanism (not shown) may be used to releasably immobilize the winch 72 at selected adjustments of the control cable 75.

It may be noted that the various drinking cups 35 are directly under the housing sections 22 for protection by the housing sections against falling particles. It is further contemplated that birds will be prevented from perching on the housing sections 22. For this purpose, an electric conductor in the form of a metal cable 82 is mounted on the upper side of the housing assembly and is electrically charged in the well known manner.

In the construction shown the two opposite ends of the conductor 82 are connected to metal hooks 84 of two end insulators 85 made of suitable plastic material. Each end insulator 85 has a base portion that straddles the corresponding housing section 22 and is anchored to the housing section by a transverse cotter pin 86. In the construction shown, coil springs 88 are provided at the opposite ends of the conductor 82 to keep the conductor under tension.

Since the charged conductor 82 may be several hundred feet long, it is supported at intermediate points by intermediate insulators 90. Each of the intermediate insulators 90 has a pair of oppositely directed hook portions 92 to engage the conductor 82, and as best shown in FIG. 4, each of the insulators is mounted in an aperture 94 in the top wall 48 of the corresponding housing section 22.

Each of the intermediate insulators 90 is made of a resilient plastic and is provided with a slot 95 in its base portion to permit the intermediate insulator to be manually contracted for snap engagement with the housing section. The base portion of the intermediate insulator 90 has a relatively wide flange 96 that engages the upper surface of the top housing wall 48 and each of the intermediate insulators is further provided with a narrower lower flange 98 to engage the under surface of the top wall.

The construction of each of the valves 25 may be understood by referring to FIGS. 5 to 8. As shown in FIG. 7, each valve has an inlet passage 100 and an outlet passage 102 with a valve chamber 104 between the two passages. The valve chamber 104 is formed by the previously mentioned enlargement 55 of the valve. The valve structure further includes a wall that forms a transverse cylinder 105 in diametrical alignment with the chamber 104, approximately half of the length of the cylinder being inside the valve with the remaining portion extending outside of the valve.

Both ends of the cylinder 105 are open and, as may be seen in FIG. 7, the inner end of the cylinder extends into the chamber 104. The cylinder 105 intersects the inlet passage 100 but has a radial port 106 (FIG. 5) that registers with the inlet passage. Thus when the valve is open, flow from the inlet passage 100 is into the cylinder 105 through the port 106 of the cylinder and out of the inner end of the cylinder through the chamber 104 to the outlet passage 102.

The previously mentioned valve member 46 is slidingly mounted in the cylinder 105 for movement between the closed position shown in FIG. 5 and the open position shown in FIG. 7. At the closed position of the valve member 46, the valve member extends across the port 106 to block off the inlet passage 100 and an O-ring 108 in a circumferential groove 110 at the inner end of the valve member prevents leakage into the chamber 104 while a second O-ring 112 in a circumferential groove 114 of the valve member cuts off leakage to the outer end of the cylinder 105. At the retracted open position shown in FIG. 7, the port 106 is unmasked to permit flow through the valve and the second O-ring 112 still serves its purpose of preventing leakage through the outer end of the cylinder.

Any suitable means may be provided to latch the valve member 46 at at least one of its two positions. In this embodiment of the invention the latch means includes a resilient plastic latch arm 115 that is integral with the handle 45 and extends longitudinally along the outer surface of the exposed portion of the cylinder 105. At the closed position of the valve shown in FIG. 5, a latching notch 116 of the latch arm 115 straddles a radial flange 118 of the cylinder 105, the flange providing a latching shoulder 120 for engagement by one side of the notch to keep the valve member from being moved to its alternate open position.

The leading end of the latch arm 115 has a finger piece 122 to facilitate manipulation of the latch arm and the leading end is further formed with a cam surface 124 that leads to the latching notch. On the other side of the latching notch 116, the latching arm is provided with a second cam surface 125. As may be seen in FIGS. 6 and 8, the radial flange 118 is relatively short measured circumferentially of the cylinder 105.

The outer end of the cylinder 105 is provided with a radial flange 126 that forms an inwardly facing latch shoulder 128. When the valve member 46 is in its open position the latching notch 116 straddles the end flange 126 with one side of the notch cooperating with the shoulder 128 to limit the outward retraction of the valve member.

Preferably the valve member 46 is further provided with a second longitudinal latch arm 130 which has a latch shoulder 132 capable of cooperating either with the latch shoulder 120 of the radial flange 118 or with the latch shoulder 128 of the radial flange 126. The leading end of the second latch arm 130 has a cam surface 134 that leads to the latch shoulder 132.

When the valve member 46 is in its closed position shown in FIG. 5 with either one of the latch arms 115, 130 in engagement with the radial flange 118, the valve member may be unlatched by simply rotating the valve member to move the engaging latch arm circumferentially away from the short latch flange 118. The valve member 46 may then be pulled to its full open position. As the valve member approaches its full open position, the cam surface 125 rides over the end flange 126 whereupon the latch notch 116 snaps into engagement with the latch flange. It is to be noted that the latch shoulder 132 of the second latch arm 130 functions as a stop shoulder in cooperation with the end flange 126 to limit the outward movement of the valve member.

To return the valve member 46 to its closed position from the position shown in FIGS. 7 and 8, it is merely necessary to push the valve member axially inwardly and then rotate the valve member approximately 90° to bring one of the two latch arms into engagement with the radial flange 118. If it so happens that one of the two latch arms is in the sector of the radial flange 118 when the valve member is moved to its closed position, the leading cam surface of the latch arm will simply ride over the radial flange to permit the latch arm to snap into engagement with the radial flange. The two cam surfaces 124 and 134 on the outer ends of the two latch arms 115 and 130 respectively, make it a simple matter to assemble the valve member 46 to the valve by inserting the valve member into the cylinder 105 and then exerting axial force in the valve member to cause the two latch arms to snap over the end flange 126.

The provision of two diametrically opposite resilient latch arms which press inwardly against opposite sides of the cylinder 105 has a stabilizing effect on the valve member in that the radial inward pressures of the two latch arms balance each other. A second advantage of providing two diametrically opposite latch arms is that when the valve member is in its closed position with one of the latch arms in engagement with the radial flange 118 as shown in FIGS. 5 and 6, only 90° of rotation of the valve member suffices to position the two latch arms free from the radial shoulder 118.

Our description of the selected embodiment of the invention in specific detail will suggest various changes, substitutions and other departures from our disclosure within the spirit and scope of the invention.

We claim:
1. In a valve, the combination of:
walls forming an inlet passage and an outlet passage spaced from each other in a first direction,
a wall forming a cylinder and having inner and outer ends and having its inner end in communication with the outlet passage and having its outer end opening onto the exterior of the valve, said cylinder extending axially in a second direction transverse to the first direction,
said cylinder extending across said inlet passage and having a side port in communication with the inlet passage;
a valve member slidingly mounted in said cylinder for axial movement in said cylinder between an inner closed position closing said side port to cut off the inlet passage and an outer open position uncovering the side port to permit fluid flow from the inlet passage through the side port into the cylinder and out of the inner end of the cylinder into the outlet passage, first locking means disposed on the cylinder, second means disposed on the cylinder in spaced relationship to the first means in the second direction, and third means disposed on the valve member for cooperation with the first means, in a first limit position defined by the second and third means, for locking the third means on the first means in the first limit position and for cooperation with the second means for limiting the sliding movement of the valve member in the second direction to a second limit position.

2. A combination as set forth in claim 1 in which the third means is defined in part by outer end of the valve member which extends beyond the outer end of the cylinder to serve as a handle for manual operation of the valve member.

3. A combination as set forth in claim 1 in which the first means includes a detent on said cylinder and in which the third means includes a latching member on said valve member to engage the detent and thereby latch the valve member to the cylinder in the first limit position.

4. A combination as set forth in claim 1 in which said third means includes an enlargement at the outer end of the valve member and further includes two arms which extend from said enlargement in sliding contact with the first means on said cylinder to stabilize the valve member relative to the cylinder.

5. A combination as set forth in claim 4 in which said first means includes an exterior shoulder on the cylinder and at least one of said arms cooperates with the shoulder to limit the movement of the valve member between the first and second limit positions.

6. A combination as set forth in claim 1 which includes a first sealing ring embracing the valve member to seal the inner end of the cylinder at the closed position of the valve member;

and which includes a second sealing ring embracing the valve member to cut off leakage at the outer end of the cylinder at both positions of the valve member.

7. A combination as set forth in Claim 1 in which said first means includes an exterior shoulder spaced axially inwardly on the cylinder from the outer end of the cylinder;

and in which the third means includes latch means united with the outer end of the valve member to overhang the exterior of the cylinder and engage said shoulder to releasably hold the valve member at its first limit position.

8. A combination as set forth in claim 7 in which said exterior shoulder has a circumferential extent of less than 360° and in which said valve member is rotatable in the cylinder to permit the latch means to be disengaged from said shoulder by manual rotation of the valve member.

9. A combination as set forth in Claim 8 in which said latch means is flexible and is formed with a cam surface at its leading end to cause the latch means to ride over, during the movement of the valve member in the second direction, said shoulder into engagement therewith.

10. Apparatus for controlling the flow of fluid through a pipeline for use by fowl, the pipeline having first and second pipes each having an inlet and an outlet, the first pipe being at the upstream end of the pipeline and the second pipe being at the downstream end of the pipeline, including, a housing defining a first opening at the outlet side of the first pipe and defining a second opening at the inlet end of the second pipe and defining an axial passage in a direction transverse to the flow of fluid through the pipeline and at a position between the first and second openings, a valve member slidable axially with the axial passage in the housing between first and second limit positions and having walls closing the opening in the inlet side of the first pipe in the first position and spaced from the opening in the inlet side of the first pipe in the second position to provide for the passage of fluid through the pipeline in the second position, means disposed on the valve member in cooperative relationship with the axial passage in the housing in the first position of the valve member for sealing the housing and the valve member against the flow of fluid in the first position of the valve member, first means on the housing member for defining a detent, second means disposed on the housing in axially spaced relationship to the first means and defining a shoulder, and third means disposed on the valve member and extending externally from the valve member and cooperative with the first means in the first limit position of the valve member for retaining the valve member in the first limit position and cooperative with the second means on the housing member in the second limit position for retaining the valve member in the second limit position.

11. Apparatus as set forth in claim 10 wherein the first means includes a first flange and the third means includes at least one latch arm having a construction for engaging the first flange in the first limit position and the second means includes a second flange on the housing at a position removed from the first flange in the axial direction for engaging the latch arm in the second position of the valve member.

12. Apparatus as set forth in claim 11 wherein the passage in the housing is cylindrical and the valve member is cylindrical and is rotatable in the passage to release the valve member from retention of the latch arm on the valve member by the first flange on the housing in the first position and to provide for an axial sliding movement of the valve member to the second position.

13. Apparatus as set forth in claim 12 wherein the first means include a flange on the housing and the valve member has a handle at one end and the third means include a latch arm extending from the handle on the valve member externally of the valve member and the latch arm has resilient characteristics and has a construction relative to the flange on the housing to provide for a locking engagement of the latch arm with the flange on the housing upon movement of the valve member to the first limit position and to provide for a disengagement of the latch arm from the flange on the housing for axial sliding movement of the valve member to the second limit position.

14. Apparatus as set forth in claim 13 wherein the latch arm has a leading edge shaped relative to the flange on the housing to facilitate the disposition of the latch arm in locking engagement with the flange on the housing in the first limit position of the valve member.

15. Apparatus as set forth in claim 14 wherein the passage in the housing is cylindrical and the valve member is cylindrical and is rotatable in the passage to release the latch arm on the valve member from retention by the flange on the housing in the first limit position and to provide for an axial sliding movement of the valve member to the second position and wherein the handle on the valve member is constructed to facilitate the gripping of the valve member for axial sliding movement between the first and second limit positions.

16. Apparatus as set forth in claim 15 wherein the second means extend externally of the housing and are cooperative with the handle on the latch member for limiting the movement of the valve member in the axial direction to the first limit position.

17. Apparatus as set forth in claim 16 wherein the second means include a flange disposed on the housing and constructed to engage the handle on the latch member in the first limit position to limit the movement of the valve member in the axial direction.

* * * * *